Nov. 18, 1958  J. R. CAVANAUGH  2,860,519
DUAL DRIVE RATIO POWER TRANSMISSION MECHANISM
Filed June 15, 1955  3 Sheets-Sheet 1
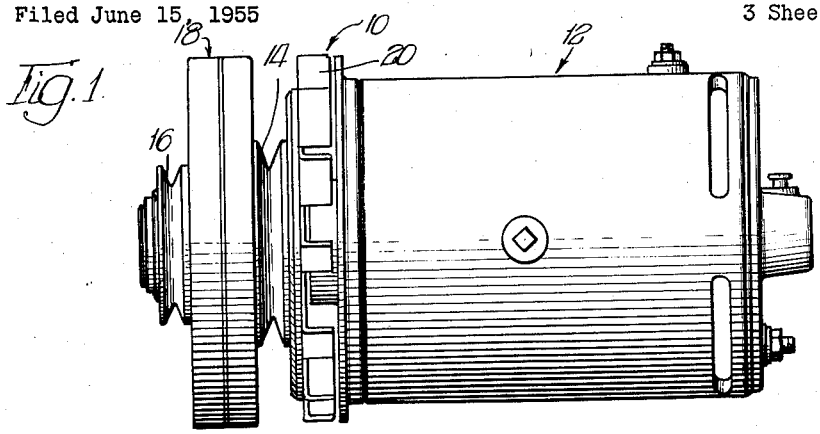
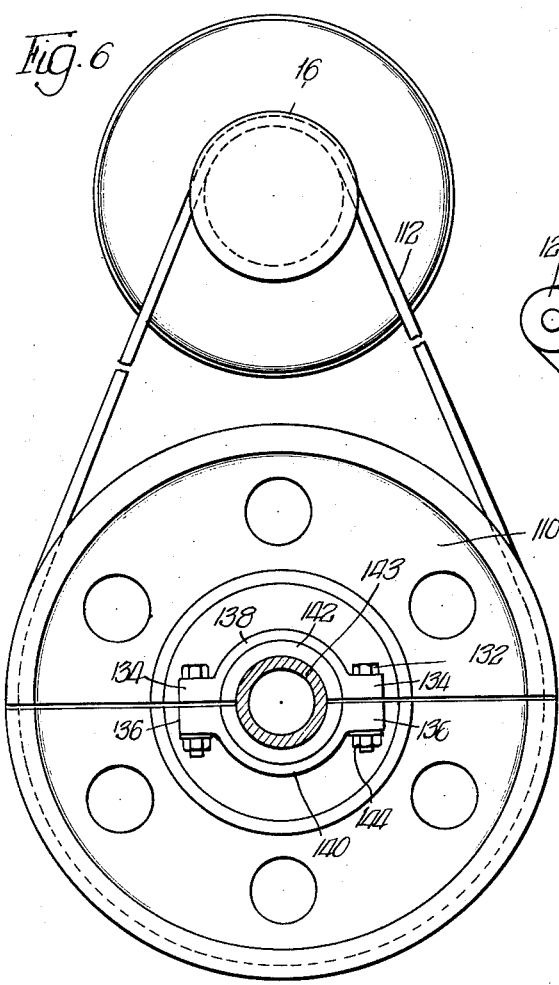
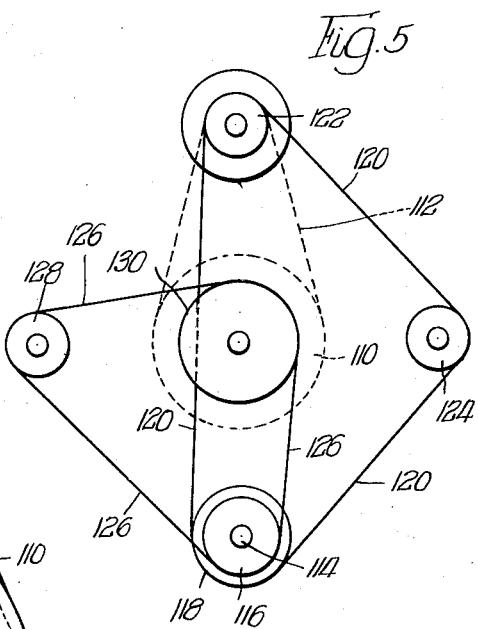
INVENTOR.
James R. Cavanaugh,
BY Wilkinson, Huxley,
Byron & Hume
Attys

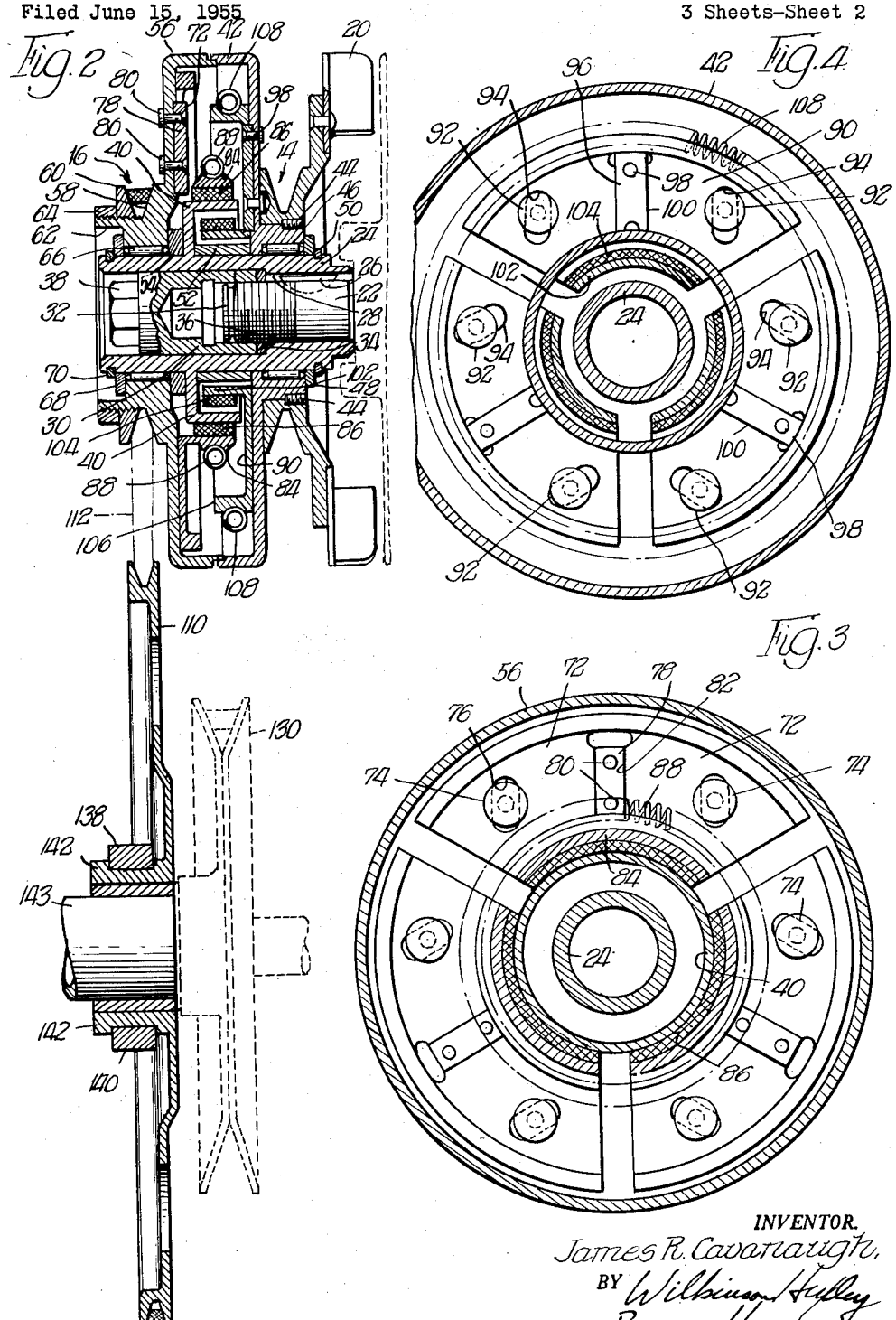

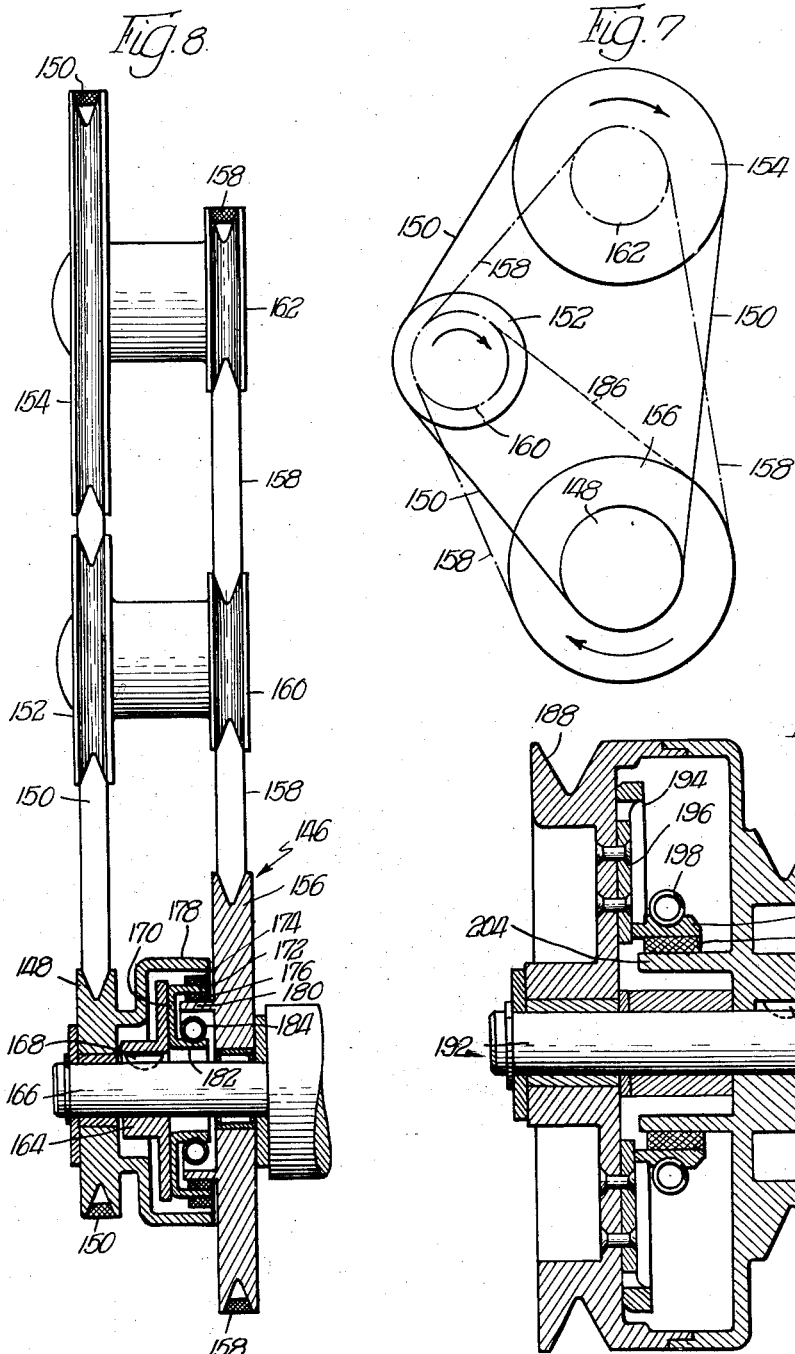

United States Patent Office 2,860,519
Patented Nov. 18, 1958

2,860,519

DUAL DRIVE RATIO POWER TRANSMISSION MECHANISM

James R. Cavanaugh, Park Ridge, Ill.; Mildred Cavanaugh, administratrix of said James R. Cavanaugh, deceased Application June 15, 1955, Serial No. 515,750

15 Claims. (Cl. 74—217)

This invention relates to power transmission mechanisms, and more particularly to a dual drive ratio, power transmission mechanism particularly adapted for use in driving automobile generators and the like.

In the conventional form of automobile generator installation, the generator shaft is provided with a pulley which is driven by a V-belt passing thereover. This belt, in turn, is driven by a pulley on the crank shaft of the automobile engine. Such a method of driving the generator necessarily means that the speed of rotation of the generator shaft and armature will be directly proportional to the speed of the engine of the automobile. Thus, at high speeds the armature of the generator is turned at high speeds, while at low engine speeds, the generator armature is rotated relatively slowly.

As a practical matter, this means that when the engine of the automobile is idling, the armature of the generator is not rotating rapidly enough to impress a charge on the battery. This condition results in a very substantial drain on the battery when the engine is idling, if loads such as that produced by the lights, heater and radio of the automobile remain connected to the battery.

The conventional generator drive has an approximate 2 to 1 ratio, so that if the engine idles at 350 to 400 R. P. M., the generator will be turning at 700 to 800 R. P. M. Since the ordinary generator will not charge the battery at less than 1500 R. P. M., this means that when the engine is idling the battery is discharging. This characteristic of a conventional electrical system for vehicles is becoming more important in view of the increasing loads which are being applied to the system, including air conditioning systems and the like.

It is therefore an object of this invention to provide a power transmission mechanism for driving a rotatable unit in which the drive ratio automatically increases when the speed of the driver drops below a given value. Still another object of this invention is to provide a dual drive ratio power transmission mechanism which is particularly adapted for use in driving the generator of an automobile, since it will insure that even at idle speeds of the automobile engine, a full charge can be impressed by the generator on the battery.

Another object of this invention is to provide a power transmission mechanism of the character described, which utilizes a double-acting, expanding shoe, centrifugal clutch mechanism to shift the drive from one belt and pulley combination to another.

Yet another object of this invention is to provide a dual drive ratio, power transmission mechanism of the character described, which is extremely simple in its construction and therefore relatively inexpensive to manufacture and remarkably free from any maintenance difficulty.

Yet another object of this invention is to provide a dual ratio drive of the character described which can drive both the generator and cooling system fan, so that the speed of rotation of both these elements is increased at low engine speeds, when both full charging of the battery and an increased flow of cooling air are very desirable.

It is also an object of this invention to provide a power transmission mechanism which can be readily inserted in an existing drive system so as to convert it quickly and simply into a dual ratio drive.

It is also an object of this invention to provide a power transmission mechanism of the character described which is capable of application to many other mechanisms where it is desirable to maintain the speed of rotation of a given element even though the speed of the driver is reduced, such as, for example, in the air compressors of vehicles having air brakes.

Further objects and advantages of this invention will become evident as the description proceeds and from an examination of the accompanying drawing which illustrates several embodiments of the invention and in which similar numerals refer to similar parts throughout the several views.

In the drawings:

Figure 1 is an elevational view of one form of power transmission mechanism incorporating the invention, the mechanism being shown disposed in operative relation with a conventional automobile generator.

Figure 2 is a view in vertical section of the power transmission mechanism shown in Figure 1.

Figure 3 is a somewhat diagrammatical view of a portion of the mechanism shown in Figure 2, illustrating the driving position of the low speed expanding shoes, or clutch segments.

Figure 4 is a somewhat diagrammatical view of a portion of the mechanism shown in Figure 2, illustrating the driving position of the high speed expanding shoes, or clutch segments.

Figure 5 is a diagrammatic representation of one form of conventional pulley and belt drive system for an automobile, with the additional pulley required for installation of a drive mechanism incorporating the present invention being shown in dotted lines.

Figure 6 is a view in vertical elevation of the additional pulley shown in dotted lines in Figure 5.

Figure 7 is a diagrammatic illustration of an alternative form of dual ratio drive mechanism incorporating the invention and disposed so as to drive an automobile generator and an automobile cooling fan simultaneously.

Figure 8 is a somewhat diagrammatical side view, partly in elevation and partly in vertical section, of the system shown in Figure 7.

Figure 9 is a view in vertical section of an alternative embodiment of one portion of the mechanism shown in Figure 8.

Referring now to Figure 1, one form of power transmission mechanism incorporating the invention indicated generally by the numeral 10 is shown therein disposed in operative association with the automobile generator indicated generally by the numeral 12. The conventional single pulley on the generator shaft has been replaced by the dual pulley assembly comprising the pulleys 14 and 16 disposed on opposite sides of the housing 18. The pulley 14 may have the fan member 20 secured thereto, or formed integrally therewith, which fan member is adapted to draw cooling air through the generator.

Referring now to Figure 2, it will be seen that the generator shaft 22 has a drive member 24 secured thereto by a conventional key 26. The key 26 is adapted to be received in the slot 28 in the driver 24, which driver has the form of a cylindrical sleeve. An area of increased diameter is provided within the bore of the driver or sleeve 24 to receive the retaining member 30 which is in the form of an internally threaded sleeve and is adapted to be screwed onto the threaded outer extremity 32 of the shaft 22. A suitable washer 34 is provided which is adapted to be disposed between the retaining sleeve 30 and the shoulder 36 within the bore of the sleeve 24. A hexagonal head 38 may be provided on the outer extremity of the sleeve 30 to aid in threading the sleeve onto the shaft 22.

A cylindrical cup-like member 40 is formed on the sleeve 24 intermediate its ends, providing the actual driving surfaces of the driver, as is more fully explained below.

The pulley 14 is here shown secured to the housing member 42 by suitable retaining members 44, although it is apparent that the members 14 and 42 could be made integral. Suitable bearing members 46 may be provided to rotatably mount the housing member 42 on the driver 24. A washer 48 and a retaining ring 50 can be used to maintain the housing member 42 in place on the driver 24. A suitable spacing sleeve 52 may be disposed between the opposite side of the housing member 42 and the cup-like member 40 on the driver 24. A similar spacing ring 54 may be provided on the opposite side of the member 40 adjacent to the housing member 56, which has one side 58 of the pulley 16 formed thereon. The opposite side 60 of the pulley 16 is in the form of an annular ring having a bevelled face on the side thereof adjacent the side 58 of the pulley 16. This annular member 60 is adapted to be threaded onto the extension 62 of the housing member 56, and secured in a selected position by the retaining ring 64. This provides an adjustability in the pulley 16 so that corrections for minor variations in the length of the belt passing thereover is possible. Suitable bearings 66 are provided for rotatably mounting the housing member 56 on the sleeve or driver 24, and the washer 68 and the retaining ring 70 may be provided to hold the housing member 56 in the assembled position.

As best shown in Figures 3 and 4, the housing members 42 and 56 both have centrifugal shoes or clutch segments slidably mounted thereon which segments are adapted to establish a driving connection between the pulleys 14 and 16, and the exterior of the cup member 40 of the driver 24, under particular conditions of operation. The segments 72 are slidably secured to the housing member 56 by the retaining members 74 which extend through the slots 76 in the segments 72, as shown in Figures 2 and 3. These slots are so disposed as to permit motion of the segments 72 toward and away from the cup member 40 on the driver 24. In addition to the retaining member 74, a key 78 may be secured to the housing member 56 by the rivets 80 for each segment, which key is adapted to be snugly and slidably received in the slot 82 formed along the central radius of the segments 72.

The inner periphery of each segment 72 has a flange 84 formed thereon projecting outwardly from the main body of the segment 72. The side of the flange 84 adjacent to the cup member 40 has a lining 86 bonded thereto of a material particularly adapted to resist frictional wear and to provide a surface which is capable of establishing a driving connection between the cup member 40 and the segments 72 when the segments are urged into association with the cup member 40 by the spring 88. As best shown in Figure 3, the spring 88 encircles the flanges 84 and normally urges the three segments 72 inwardly toward the axis of rotation of the drive member 24. The spring 88 is selected so that the constricting action provided thereby is sufficient to maintain the segments 72 in driving relation with the cup member 40 at relatively low speeds of rotation of the pulley 16.

As soon as the speed of rotation of the pulley 16 exceeds a selected value, however, the centrifugal force acting on the segments 72 becomes great enough to overcome the constricting force of the spring 88, so that the segments 72 will slide outwardly along the keys 82, and the driving connection between the housing 56 and the cup member 40 on the driver 24 will be broken.

The housing member 42 is similarly provided with clutch segments 90 which are comparable to the segments 72. The segments 90 are slidably secured to the housing 42 by the retaining members 92 extending through the slots 94 in the segments 90. A key 96 is secured to the housing member 42 by the rivets 98 for each segment, and is designed to be snugly received within a slot 100 in each segment 90. The flange 102 at the inner periphery of each segment 90 is adapted to extend within the cup member 40 of the driver 24 and has a lining 104 bonded to one side thereof so that it is disposed between the flange 102 and the cup 40. This lining 104 serves the same purpose as the lining 86 previously described, being adapted to establish a driving connection between the segments 90 and the cup member 40 when the segments are moved outwardly into abutting relation with the interior of the cup 40.

A second flange 106 is provided at the outer periphery of each of the segments 90 and a spring member 108 is supported thereby. As shown in Figure 4, this spring member 108 encircles the three segments 90 and normally applies a constricting force thereto so that they are moved inwardly a sufficient distance to cause the lining 104 on each segment to be out of association with the interior surface of the cup member 40. This condition exists until such time as the rotational speed of the housing member 42 and the associated pulley 14 reaches a value such that the constricting force of the spring 108 is overcome by centrifugal force acting on the segments 90.

By an appropriate choice of the spring members 88 and 108, the segments 72 can be caused to move outwardly at a pre-selected rotational speed of the pulley 16. Likewise, the segments 90 can be caused to move outwardly at a rotational speed slightly above that which first causes the segments 72 to move outwardly. This means that the driving connection between the pulley 16 and the drive member 24 will be broken at a particular speed and the driving connection between the segments 90 and the driver 24 will be established immediately thereafter, if the speed of the pulley 14 continues to increase. From a practical standpoint, this means, of course, that the ratio of the drive for the shaft 22 can be automatically shifted at a preselected speed of the shaft 22.

In the case of the automobile generator illustrated in Figure 1, the speed at which this shift occurs can be selected to be that immediately above the idling speed of the engine of the automobile. Likewise, the pulley 110 which drives pulley 16 through a suitable belt 112 may be of a substantially larger diameter than the pulley which drives the pulley 14. Such an arrangement is shown in Figure 5, which illustrates, more or less diagrammatically, the type of drive arrangement used in a 1953 model Ford automobile. In this particular form of drive the crank shaft 114 carries two pulleys 116 and 118. The pulley 118 has a V-belt 120 passing thereover, which belt in turn passes over the pulley 122 driving the generator, the pulley 124 operating one of the twin water pumps. The pulley 116, on the other hand, has the belt 126 passing thereover which is also in operative association with the pulley 128 operating the other water pump, and the pulley 130 for the radiator cooling fan.

In order to install a power transmission mechanism of the character previously described above in the conventional 1953 Ford, it is only necessary to remove the pulley 122 and replace it with the double pulley assembly shown in Figure 2, with the belt 120 originally passing over pulley 122 being passed over pulley 14. Since the conventional pulley of the generator is retained thereon by a nut threaded onto the threaded portion 32 of the shaft 22, this replacement can be very readily made by merely sliding the driver 24 into place on the shaft 22, the key 26 being the same key that was utilized to hold the original pulley 122 in place on the shaft 22. The retaining sleeve 30 may then be threaded on the shaft 22 in substantially the same fashion as the original nut which held the original pulley 122. The pulley 14 will then be driven in exactly the same manner as the original pulley 122.

As shown in Figure 5, the fan member is driven by the pulley 130. An auxiliary pulley 110, previously mentioned, may be secured to the hub of the fan as shown in Figure 6, in order to provide a drive for the pulley 16 in the power transmission mechanism through the auxiliary belt 112. The pulley 110 may be in the form of a split pulley, as shown, the two halves of which may be bolted together by the insertion of bolts 132 through the ears 134 and 136 formed in the two clamp sections 138 and 140 which are adapted to be secured around the hub member 142 of the pulley 110. By tightening the bolts 132 upon which the nuts 144 have been threaded, the two halves of the clamp member will cause the pulley 110 to be firmly secured to the hub 143 of the fan member and provide a source of drive for the belt 112 and the pulley 16.

In such an installation on a 1953 Ford, if we assume that the engine speed at idle is between 300 and 400 R. P. M., with an approximately 2 to 1 ratio between the drive pulley 118 and the generator pulley 122, the generator R. P. M. will be 600 to 800. At these speeds, the generator is not charging, so that at idle there will be a constant drain on the battery, the size of which is normally dependent upon the number of lights and accessories which are being operated.

With the power transmission mechanism described above installed, however, at engine idle speed, pulley 16 will be in driving engagement with the shaft 22 of the generator through the segments 72 and the driver 24, and this pulley in turn will be driven through the belt 112 by the pulley 110, giving a 5 to 1 ratio, rather than the conventional 2 to 1 ratio. There will be a resultant speed of the generator of between 1500 and 2000 R. P. M., which speed is sufficient to provide a charge of between 16 and 20 amperes. Since the lights, heater and radio of a 1953 Ford require approximately 16 to 20 amperes, there will be no drain on the battery, even under extreme conditions.

As previously indicated, by proper selection of the spring 88, the driving connection between the pulley 16 and shaft 22 can be disengaged as soon as the engine speed increases slightly above the normal idling speed. This, as a practical matter, means that the pulley 16 can be disengaged very shortly after the automobile is put into motion in low gear. Likewise, the spring 108 can be selected so that, as the speed of the engine continues to increase, the segments 90 will move quickly into gripping relation with the drive cup 40 so that the entire change-over from pulley 16 to pulley 14 will take place within a change in speed of the automobile of one or two miles an hour, at the most. Since, under all normal circumstances, the change-over will occur at a moment of acceleration or de-acceleration, there will be substantially no possibility that the power transmission mechanism will be run at a speed between the two speeds at which the segments shift for more than an extremely short period of time.

It may thus be seen that a power transmission mechanism has been provided which is unusually simple in its construction and operation, and yet which furnishes a positive, automatic shift in the drive ratio which shift can be used to very substantial advantages in the activation of an automobile generator, or the like.

Referring now to Figures 7 and 8, an alternative form of drive arrangement is shown therein, in which the power transmission mechanism, indicated generally by the numeral 146, is secured to the crank shaft of the automobile engine, as distinguished from the shaft of the generator. As shown somewhat diagrammatically in Figure 7, the pulley 148 of the power transmission mechanism is connected by the belt 150 to the pulley 152 on the generator and to the pulley 154 on the cooling fan. The pulley 156 in the power transmission mechanism is connected by the belt 158 to the pulley 160 on the generator and to the pulley 162 on the cooling fan. As shown in Figure 8, the power transmission mechanism is similar to that disclosed in Figure 2. However, each pulley is provided with a driving cup member and a single set of double faced segments is slidably mounted on a driver secured to the shaft.

More particularly, the driver 164 is keyed to the shaft 166 through the key 168 so that it rotates therewith. The segments 170 are slidably mounted on the driver 164 substantially in the same fashion as the segments 72 and 90, previously described in connection with the form of mechanism shown in Figure 2. A shoulder or flange 172 is formed on the outer periphery of the segments 170 with a lining 174 being bonded to the outer side of the shoulder and a lining 176 being bonded to the inner side of the shoulder. A driving cup 178 is formed integrally with the pulley 148 and the lining 174 is adapted to be moved into driving engagement with the internal surface of the cup 178, substantially in the same fashion as the lining 104 on the segments 90, in the form of mechanism previously described. The lining 176 is adapted to be normally held in driving engagement with the external surface of the driving cup member 180 formed integrally with the pulley 156. The flange or shoulder 182 formed on the inner periphery of the segment 172 is adapted to cooperate with the spring member 184. This spring member normally tends to apply a constricting force to the segments 170 and to therefore maintain the lining 176 in driving relation with the cup member 180. On the other hand, when the speed of rotation of the driver 164 reaches a selected value, the centrifugal force acting on the segments 170 becomes great enough to expand the spring member 184 and to cause the lining 176 to move out of engagement with the cup member 180 and the lining 174 to move into driving relation with the flange 178.

The end result is that although the driver 164 is initially in driving engagement with the pulley 156 at low speeds of rotation, the pulley 156 is automatically thrown out of driving engagement, and the pulley 148 brought into driving engagement as the driver is accelerated. Since the pulley 156, as shown, is substantially larger than either the pulley 160 or 162, while the pulley 148 is either approximately the same size or smaller than the pulleys 152 and 154, the drive ratio is obviously substantially changed by this shift.

If the belting is as indicated in Figure 7, this means that when the engine is idling, the speed of the generator and the fan are both increased over what they otherwise would be, if the single ratio form of drive were being used. Since there is still need for a substantial flow of cooling air when the engine is idling because the vehicle is then not normally moving, the increase in speed of rotation of the fan at idle is likewise desirable.

It is conceivable that in some installations it would be desirable to have the fan positively driven only at relatively low speeds of the engine. In such an instance, the pulley 154 of the fan could be eliminated and the belt 150 could be replaced by the belt 186 shown in dotted lines in Figure 7. This would mean, of course, that only the generator would be rotated positively from the engine drive at high speeds, whereas both the generator and fan would be positively rotated at low engine speeds by the belt 158.

Still another possible modification would be to replace the pulleys 154 and 162 utilized to drive the fan in the arrangement shown in Figures 7 and 8, with the pulley arrangement shown in Figure 9. The pulley 154 would be replaced by the pulley 188, and the pulley 162 by the pulley 190, and the pulleys 188 and 190 would then be driven by the pulleys 148 and 156, respectively, on the power transmission mechanism. However, the particular construction of the assembly of pulleys 188 and 190 would permit the pulley 188 to be disengaged from driving relationship with the shaft 192 of the fan member at a selected intermediate speed. To accomplish this purpose, the pulley 188 would have the segment members 194 slidably secured thereto, in substantially the same fashion as the segments 72 are secured to the housing member 56, as previously described and shown in Figure 2. The key member 196 is of substantially the same construction as the key member 78, and the spring member 193 corresponds to the spring member 84. This spring member 198 is mounted in association with the flange 200 on the inner periphery of the segment members 194. The inner side of the flange has the lining 202 bonded thereto, which lining is adapted to be disposed in driving relation with the cup member 204 integrally formed with the pulley 190. The pulley 190 is keyed to the shaft 192 through the key 206 so that the pulleys 190 and 188 normally rotate with the shaft 192.

Normal operation is therefore comparable to the operation shown in Figures 7 and 8. However, after the pulley 188 and the pulley 148 become the driving members, a second change occurs at an even higher speed of rotation of the crank shaft 166. The spring member 198 is selected so that its constrictive force is such that the segments 194 are thrown out at a speed of revolution of the pulley 188 considerably above the speed at which the segments 172 are moved into engagement with the drive cup 178 on the pulley 148. Thus, after the crank shaft 166 reaches a second selected speed, the pulley 188 is disengaged from driving relation with the pulley 196 and the shaft 192. This means that at idling speeds of the crank shaft 166, the fan is driven through the pulley 146 and the pulley 190. At speeds above idling speeds, but below the second selected speed, the fan is driven through the pulley 148 and the pulley 188, while at speeds above the second selected speed, the pulley 188 is disengaged from driving relation so that no actual drive is imparted to the fan member.

This disengagement of the fan at relatively high speeds of the crank shaft 166 has the advantage that at high speeds of the automobile itself, when there is a very heavy flow of air due to the motion of the vehicle, the driving of the fan is dispensed with, whereas at intermediate speeds, the fan is driven by a relatively low ratio drive. At idling speeds, however, the ratio of the drive for the fan is automatically increased so that a substantial flow of cooling air is maintained even though the vehicle may be stationary.

The power transmission mechanisms described above all use a centrifugal clutch arrangement to throw out a high ratio belt and pulley drive and to simultaneously throw in a relatively low ratio drive, after certain preselected speeds are achieved. In the principal embodiment of the invention, this is accomplished by utilizing a drive member having a concave and convex surface, the initial clutching engagement being established with respect to the convex surface thereof, and after release thereof, a second clutching engagement being produced in relation to the concave surface thereof. This concept of disengaging a normally engaged clutching mechanism through centrifugal action, and the immediate subsequent engagement of a second clutching mechanism by the centrifugal action, is one of the novel aspects of this invention.

In addition to the embodiments described above and shown in the drawings, it would also be possible to combine the form of drive mechanism associated with the drive shaft 166 in Figure 8, with a mechanism made up of two pulley arrangements such as the pulley 14 shown in Figure 2. In such an arrangement the drive cup 40 could have a flange extending to each side thereof and the two pulleys having the construction of the pulley 14 in Figure 2 could be disposed on each side, so that the movable clutch mechanisms 102 could move into driving relation with the flanges associated therewith. This combination would enable the set of pulleys which is not actually being driven, to remain stationary.

In the drawing and specification, there have been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention, as further defined in the following claims.

I claim:

1. A variable drive ratio power transmission mechanism comprising: a drive shaft; a driven shaft; a pair of driven members rotatably mounted on said driven shaft; driving means independently connecting each said rotatable driven member to a drive member fixed to said drive shaft, each set of drive and driven members so connected having a different drive ratio; centrifugally movable clutch means adapted to secure one of said driven members to said driven shaft in direct driving relation thereto below a relatively low speed of rotation of said drive shaft, and to release said driven member so secured above said speed of rotation; and additional centrifugally movable clutch means adapted to secure the other of said rotatable members in direct driving relation to said driven shaft at speeds above said relatively low speed of rotation of said drive shaft.

2. A variable drive ratio power transmission mechanism comprising: a drive shaft; a driven shaft; a pair of driven members rotatably mounted on said driven shaft; flexible loop drive means independently connecting each said driven member with a drive member secured to said drive shaft, the relative size of said members in each set so connected being such that the drive ratios thereof are different; and centrifugally movable clutch means adapted to selectively secure one of said driven members directly to said driven shaft below a relatively low speed of rotation of the drive shaft, and to release said one of said driven members so secured and secure the other of said driven members directly to said driven shaft at speeds above said relatively low speed of rotation of said drive shaft.

3. A variable driven ratio power transmission mechanism comprising: a drive shaft; a driven shaft; a pair of pulley members mounted to rotate freely on said drive shaft; centrifugally movable clutch means adapted to selectively connect one of said pulley members to said drive shaft below a relatively low speed of rotation of said drive shaft, and to release said one of said pulley members so secured and secure the other of said pulley members to said drive shaft at speeds above said relatively low speed of rotation of said drive shaft; a plurality of pulley members secured to said driven shaft; and a plurality of flexible loop drive members interconnecting each one of said first named pulley members to one of said last named pulley members, the relative sizes of each pair of pulleys so interconnected being such that the drive ratio between each pair is different.

4. A variable drive ratio power transmission mechanism comprising: a drive shaft; a driven shaft; a pair of pulley members, the relative sizes of each pair of pulleys adapted to be independently connected in driven relation to said drive shaft at different drive ratios; drive means carried by said drive shaft member; means for independently connecting said drive means to said driven rotatable members at selected drive ratios; centrifugally disengageable clutch means carried by one of said driven rotatable members and normally drivingly connecting said rotatable member to said driven shaft member when said driven shaft member is rotating at a relatively low speed; and normally disengaged, centrifugally engageable clutch means carried by the other of said driven rotatable members adapted to drivingly connect said last named rotatable member to said driven shaft member when said drive shaft is rotating above a predetermined speed level, and when said centrifugally disengageable clutch means are disconnected from said driven shaft member.

5. A variable drive ratio power transmission mechanism comprising: a drive shaft; a driven shaft member; a pair of rotatable members rotatably mounted on said driven shaft member; drive means independently connecting each said rotatable member in driven relation to said drive shaft at different drive ratios; and centrifugally movable clutch means carried by each said rotatable member, one such means being adapted to be moved into driving engagement with said driven shaft only when the speed of rotation of said rotatable member exceeds a selected value, and the other of such means being adapted to be moved into driving engagement with said driven shaft only when the speed of rotation of said rotatable member drops below a selected value.

6. A variable drive ratio power transmission mechanism comprising: a drive shaft; a driven shaft member; a pair of rotatable members rotatably mounted on said driven shaft member; drive means independently connecting each said rotatable member in driven relation to said drive shaft at different drive ratios; and centrifugally movable clutch means adapted to selectively connect one of said rotatable members to said driven shaft below a relatively low speed of rotation of said driven shaft and to release said one of said rotatable members so secured and secure the other of said rotatable members to said driven shaft at speeds above said relatively low speed of rotation of said drive shaft.

7. In a variable drive ratio power transmission mechanism having a drive shaft and a driven shaft; a pair of pulley members mounted to normally rotate freely on said driven shaft; centrifugally movable clutch means carried by each said pulley member, one such means being adapted to be moved out of and the other of such means being adapted to be moved into driving engagement with said driven shaft when the speed of rotation of said drive shaft exceeds a selected value; a plurality of pulley members driven by said drive shaft; and a plurality of flexible loop drive members interconnecting each one of said first named pulley members to one of said last named pulley members, the relative sizes of each pair of pulleys so interconnected being such that the drive ratio between each pair is different.

8. A dual ratio power transmission mechanism comprising: a drive shaft; a driven shaft; a pair of torque transmitting members rotatably mounted on said driven shaft; driving means independently interconnecting each of said torque transmitting members to said drive shaft at a selected drive ratio; centrifugally disengageable clutch means normally connecting one of said torque transmitting members in driving engagement with said driven shaft and normally disengaged, centrifugally engageable clutch means adapted to connect the other of said torque transmitting members in driving engagement with said driven shaft after said first named clutch means is disengaged.

9. A dual ratio power transmission mechanism comprising: a drive shaft; a driven shaft; a driven cup secured to said driven shaft; a pair of torque transmitting members rotatably mounted on said driven shaft; driving means independently interconnecting each of said torque transmitting members to said drive shaft at a selected drive ratio; centrifugally disengageable clutch means normally connecting one of said torque transmitting members in driving engagement with the exterior surface of said driven cup; and normally disengaged, centrifugally engageable clutch means adapted to connect the other of said torque transmitting members in driving engagement with the internal surface of said driven cup after said first named clutch means is disengaged.

10. A dual ratio power transmission mechanism for a drive shaft and a driven shaft comprising: a driven sleeve secured to said driven shaft; a driven cup secured to said driven sleeve; a pulley member rotatably mounted on said driven sleeve; a driving means interconnecting said pulley member to said drive shaft at a selected drive ratio; centrifugally disengageable clutch means carried by said pulley member normally connecting said pulley member in driving engagement with said driven cup; a second rotatable pulley member rotatably mounted on said driven sleeve; a second driving means interconnecting said second pulley member to said drive shaft at a selected drive ratio; and a normally disengaged, centrifugally engageable clutch means carried by said second pulley member adapted to connect said second pulley member in driving engagement with said driven cup after said first named clutch means has been disengaged.

11. In a dual ratio power transmission mechanism for a driven shaft, the combination of a driven sleeve secured to said driven shaft; a driven cup secured to said driven sleeve; a pulley member rotatably mounted on said driven sleeve; a plurality of normally constricted clutch segments carried by said pulley member adapted to normally engage the external surface of said driven cup so as to connect said pulley to said driven sleeve in driving relation, said segments being centrifugally disengageable from said driving relation with said driven cup; a second pulley member rotatably mounted on said driven sleeve; a plurality of clutch segments carried by said second pulley member normally disengaged from the interior surface of said driven cup, but centrifugally engageable therewith so as to drivingly engage said cup; and means normally maintaining said last named clutch segments disengaged from the interior surface of said driven cup.

12. A variable drive ratio power transmission mechanism comprising: a drive shaft; a driven shaft; a plurality of driven members rotatably mounted on said driven shaft; means for independently connecting said drive shaft to said driven rotatable members at selected drive ratios; centrifugally disengageable clutch means carried by one of said driven rotatable members and normally drivingly connecting said one rotatable member to said driven shaft member at relatively low speeds of rotation of the drive shaft; and normally disengaged, centrifugally engageable clutch means carried by the other of said driven rotatable members adapted to drivingly connect said last named rotatable member to said driven shaft member when said centrifugally disengageable clutch means are disconnected from said driven shaft member at speeds above said relatively low speeds of rotation of the drive shaft.

13. In a variable drive ratio power transmission mechanism having a first shaft, a second shaft member, a first pair of torque transmission members secured to said first shaft member, and driving means independently connected to each torque transmission member in said first pair, the combination comprising: a second pair of torque transmission members rotatably mounted on said second shaft member, and adapted to be operatively connected to said driving means; centrifugally disengageable clutch means carried by one of said torque transmission members in said second pair normally connecting said torque transmission member to said second shaft member at relatively low speeds of rotation of the drive shaft; and normally disengaged, centrifugally engageable clutch means carried by the other of said torque transmitting members in said second pair adapted to connect said other torque transmission member to said second shaft member when said centrifugally disconnectable clutch means are disconnected from said second shaft member.

14. A variable drive ratio power transmission mechanism comprising: a first shaft; a second shaft; a first pair of torque transmitting members rotatably mounted on said second shaft member; driving means independently connecting each said rotatable torque transmitting member to an additional torque transmitting member fixed to said first shaft member, each set of torque transmitting members so connected having a different drive ratio; centrifugally movable clutch means adapted to secure one of said rotatably mounted torque transmitting members to said second shaft member below a relatively low speed of rotation of said first shaft member and to release said drive member so secured above said speed of rotation; and additional centrifugally movable clutch means adapted to secure the other of said first named torque transmitting members to said second shaft member at speeds above said relatively low speed of rotation of said first shaft member.

15. A variable drive ratio power transmission mechanism comprising: a pair of shaft members; a first pair of torque transmitting members rotatably mounted on the first of said shaft members; a second pair of torque transmitting members fixed to the second of said shaft members; means for independently interconnecting each of said first torque transmitting members to one of said second torque transmitting members, the drive ratio of each set so interconnected being different; and centrifugally movable clutch means adapted to selectively connect one of said first torque transmitting members to said first shaft below a relatively low speed of rotation of said first shaft and to release said one of said first torque transmitting members so secured and to secure the other of said first torque transmitting members to said first shaft at speeds above said relatively low speed of rotation of said first shaft.

References Cited in the file of this patent

UNITED STATES PATENTS

| | | |
|---|---|---|
| 2,230,293 | Harris | Feb. 4, 1941 |
| 2,376,665 | Cross | May 22, 1945 |
| 2,641,137 | Orcutt et al. | June 9, 1953 |
| 2,694,175 | Davis | Nov. 9, 1954 |

UNITED STATES PATENT OFFICE

CERTIFICATE OF CORRECTION

Patent No. 2,860,519                                                 November 18, 1958

James R. Cavanaugh

It is hereby certified that error appears in the printed specification of the above numbered patent requiring correction and that the said Letters Patent should read as corrected below.

Column 8, line 67, for "pully members, the relative sizes of each pair of pulleys" read -- driven members, rotatably mounted on said driven shaft, --.

Signed and sealed this 24th day of February 1959.

(SEAL)
Attest:

KARL H. AXLINE
Attesting Officer

ROBERT C. WATSON
Commissioner of Patents